(12) United States Patent
Tano et al.

(10) Patent No.: US 8,784,156 B2
(45) Date of Patent: Jul. 22, 2014

(54) GRINDING METHOD FOR GRINDING A WORKPIECE USING A GRINDING WHEEL

(75) Inventors: Makoto Tano, Obu (JP); Yoshio Wakazono, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 439 days.

(21) Appl. No.: 13/178,871

(22) Filed: Jul. 8, 2011

(65) Prior Publication Data

US 2012/0028543 A1 Feb. 2, 2012

(30) Foreign Application Priority Data

Jul. 27, 2010 (JP) ................................. 2010-168011

(51) Int. Cl.
*B24B 1/00* (2006.01)
*B24B 49/18* (2006.01)
*B24B 51/00* (2006.01)

(52) U.S. Cl.
USPC ........... 451/5; 451/8; 451/10; 451/21; 451/56

(58) Field of Classification Search
CPC ...... B24B 49/003; B24B 49/12; B24B 49/18; B24B 51/00; B24B 53/00; B24B 53/017; B24B 53/04
USPC ........... 340/680; 451/5, 6, 8, 9, 10, 11, 21, 56
See application file for complete search history.

(56) References Cited

U.S. PATENT DOCUMENTS

| | | | | |
|---|---|---|---|---|
| 4,461,125 A | * | 7/1984 | Wuest | 451/5 |
| 4,640,057 A | * | 2/1987 | Salje | 451/5 |
| 5,097,632 A | * | 3/1992 | Yamamori et al. | 451/5 |
| 5,323,572 A | * | 6/1994 | Guenin | 451/21 |
| 6,186,864 B1 | * | 2/2001 | Fisher et al. | 451/6 |
| 2004/0231245 A1 | * | 11/2004 | Yamamoto et al. | 51/307 |

FOREIGN PATENT DOCUMENTS

| | | |
|---|---|---|
| JP | 5-104407 | 4/1993 |
| JP | 11-277428 | 10/1999 |

* cited by examiner

*Primary Examiner* — Timothy V Eley
(74) *Attorney, Agent, or Firm* — Oblon, Spivak, McClelland, Maier & Neustadt, L.L.P.

(57) ABSTRACT

A core grinding wheel that has a grinding layer on an outer periphery of a core is used. An ultrasonic wave is output from an ultrasonic sensor to the grinding layer via grinding fluid. An ultrasonic measuring device control unit calculates a thickness of the grinding layer on the basis of a sonic velocity in the grinding layer and an arrival time difference between a reflected wave from a surface of the grinding layer and a reflected wave from a surface of the outer periphery of the core. A grinding process and a truing process are controlled on the basis of an outside diameter of the grinding wheel, which is calculated on the basis of the measured thickness of the grinding layer and an outside diameter of the core.

5 Claims, 9 Drawing Sheets

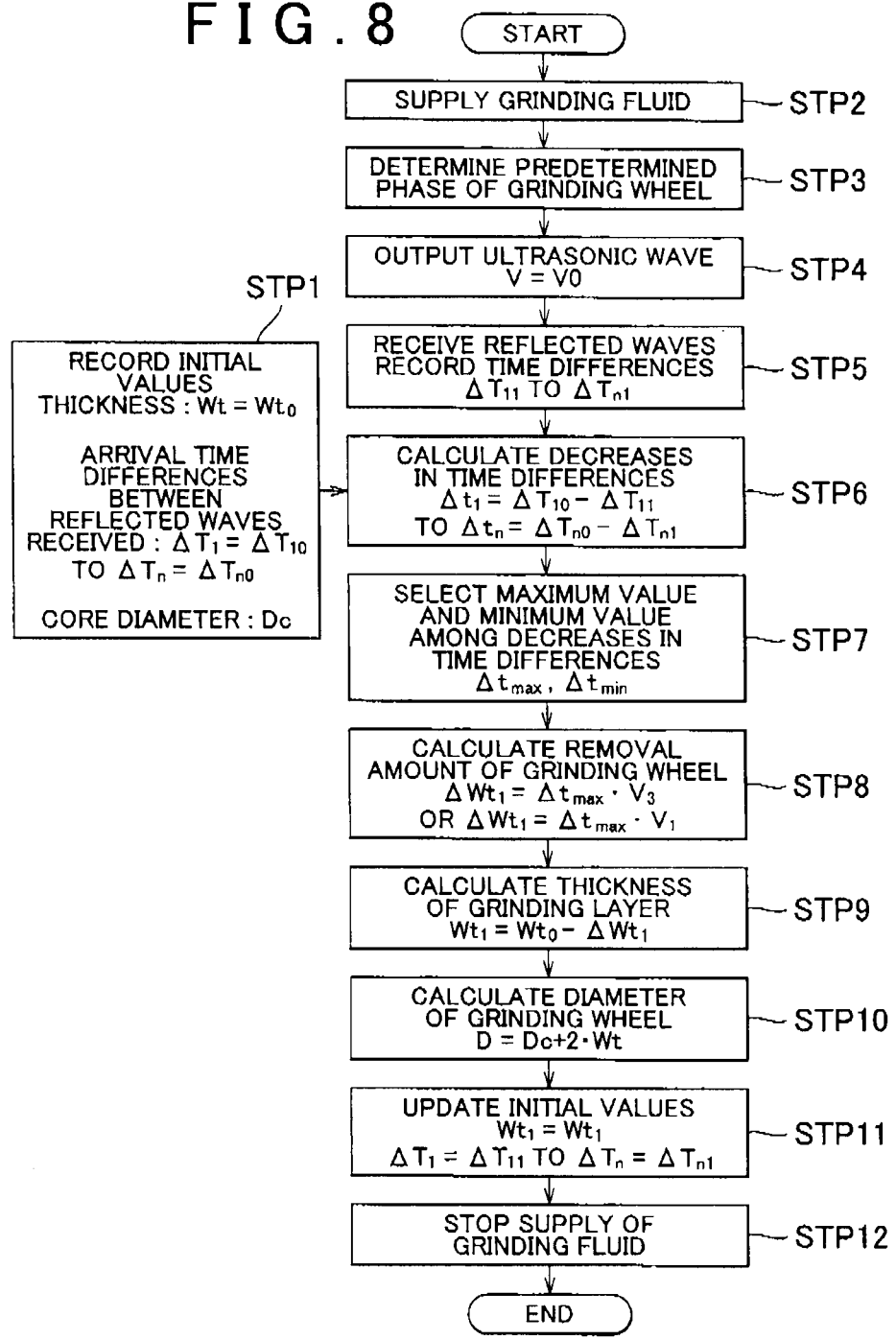

GRINDING METHOD FOR GRINDING A WORKPIECE USING A GRINDING WHEEL

INCORPORATION BY REFERENCE/RELATED APPLICATION

This application claims priority to Japanese Patent Application No. 2010-168011 filed on Jul. 27, 2010 the disclosure of which, including the specification, drawings and abstract, is incorporated herein by reference in its entirety.

BACKGROUND OF THE INVENTION

1. Field of the Invention

The invention relates to a grinding operation control and, more particularly to a grinding method and grinding machine with which a change in the outside diameter of a grinding wheel during grinding is measured to control a grinding operation.

2. Discussion of Background

During grinding, the outside diameter of a grinding wheel changes due to wear of the grinding wheel caused by grinding or a repair of a grinding layer of the grinding wheel. Detecting the amount of change in the outside diameter to control a grinding operation based on the detected change amount is indispensable for improving grinding accuracy and grinding efficiency. Japanese Patent Application Publication No. 11-277428 (JP-A-11-277428) describes a technique of calculating the outside diameter of a grinding wheel by measuring a surface position of a grinding portion of the grinding wheel using a touch probe, as a method of measuring the outside diameter of a grinding wheel. In addition, Japanese Patent Application Publication No. 5-104407 (JP-A-5-104407) describes a technique of measuring wear of a grinding wheel by an ultrasonic measuring method.

According to the technique described in JP-A-11-277428, the outside diameter of the grinding wheel is calculated through a grinding wheel measuring process that includes grinding a transfer pin and measuring the surface position of the transfer pin using a touch probe held by an arm made of a low thermal expansion material. Therefore, a measuring process is required and, as a result, the rate of operation of a grinding machine decreases. In the technique described in JP-A-5-104407, the amount of wear of the grinding wheel is measured on the basis of a change in the distance between the surface of the grinding wheel and an ultrasonic sensor head. Therefore, a change in the distance between the installation position of the ultrasonic sensor head and the rotation center position of the grinding wheel is also incorporated in change in the amount of wear. As a result, an error may be caused. Particularly, it is difficult to suppress a change in the distance due to the thermal expansion of a component resulting from a temperature change. In principle, a change in the distance may be suppressed by using a low thermal expansion material to form a component or keeping an ambient temperature constant. However, an expensive material or a temperature controller is required.

SUMMARY OF THE INVENTION

The invention is made in light of the above-described circumstances, and it is an object of the invention to provide a grinding method and a grinding machine that make it possible to measure the outside diameter of a grinding wheel in a short period of time with a simple configuration even during grinding or truing, thereby improving the rate of operation of the grinding machine at low cost.

According to a feature of an example of the invention, in a grinding method for grinding a workpiece using a grinding wheel that has a grinding layer on an outer periphery of a core of the grinding wheel, a grinding operation and a truing operation are controlled on the basis of an outside diameter of the grinding wheel, which is obtained by calculating an outside diameter of the core and a thickness of the grinding layer; calculating a time difference in arrival at an ultrasonic sensor between a reflected wave from a surface of the grinding layer and a reflected wave from a surface of the outer periphery of the core; and calculating the outside diameter of the grinding wheel.

A reduction amount of the grinding wheel diameter is measured on the basis of a sonic velocity in the grinding layer and a difference between an arrival time difference between a reflected wave from a surface of the grinding layer before the grinding wheel diameter is reduced and a reflected wave from a surface of the outer periphery of the core and an arrival time difference between a reflected wave from a surface of the grinding layer after the grinding wheel diameter is reduced and a reflected wave from the surface of the outer periphery of the core, so it is possible to measure an accurate grinding wheel outside diameter that is not influenced by changes in distance between an ultrasonic head and a grinding wheel. In addition, the grinding wheel outside diameter may be measured in a state where grinding fluid adheres to the surface of the grinding wheel, so the outside diameter of the grinding wheel may be measured even during truing or immediately after truing. Therefore, a time required to measure the outside diameter of a grinding wheel is reduced to thereby make it possible to reduce a decrease in the rate of operation of the grinding machine.

According to another feature of an example of the invention, the predetermined reduction amount is calculated on condition that the component sonic velocity is the fastest among sonic velocities in components that constitute the grinding layer and the decrease in time difference is the smallest among the decreases in time differences measured at a plurality of points.

According to a further feature of an example of the invention, the predetermined reduction amount is calculated on condition that the component sonic velocity is the slowest among sonic velocities in components that constitute the grinding layer and the decrease in time difference is the largest among the decreases in time differences measured at a plurality of points.

A removed component that constitutes the grinding layer is determined, and the removal amount may be accurately calculated using the sonic velocity in the removed component, so it is possible to measure an accurate grinding wheel outside diameter.

According to another feature of the invention, by way of example, the outside diameter of the grinding wheel is measured while the workpiece is being ground, and the grinding operation is controlled using an amount of change in the outside diameter of the grinding wheel as an amount of wear of the grinding wheel due to grinding. The outside diameter of the grinding wheel is measured in a short period of time during grinding, and the measured outside diameter of the grinding wheel is used to change a grinding start position of the grinding wheel or to evaluate the amount of wear of the grinding wheel to thereby determine whether to carry out truing. Thus, it is possible to reduce an idle grinding time or carry out truing after a grinding wheel is used until its service life limit, so it is possible to improve efficiency and reduce grinding cost.

Further by way of example, according to another aspect of the invention, the outside diameter of the grinding wheel is measured while the grinding wheel is being trued, and the truing operation is controlled using an amount of change in the outside diameter of the grinding wheel as a removal amount of the grinding wheel due to truing. An amount of change in the outside diameter of the grinding wheel may be continuously measured during truing, so it is possible to accurately control truing operation that is based on an actual removal amount of the grinding wheel and that does not require unnecessary removal of grinding wheel, so it is possible to reduce grinding cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart that shows a grinding process according to the embodiment;

DETAILED DESCRIPTION OF EMBODIMENTS

Hereinafter, a grinding process and a truing process that include a grinding wheel diameter measuring process performed using an ultrasonic measuring device according to an embodiment of the invention will be described on the basis of an example embodiment of an external cylindrical grinding machine with reference to FIG. 1 to FIG. 11.

Figure 1:
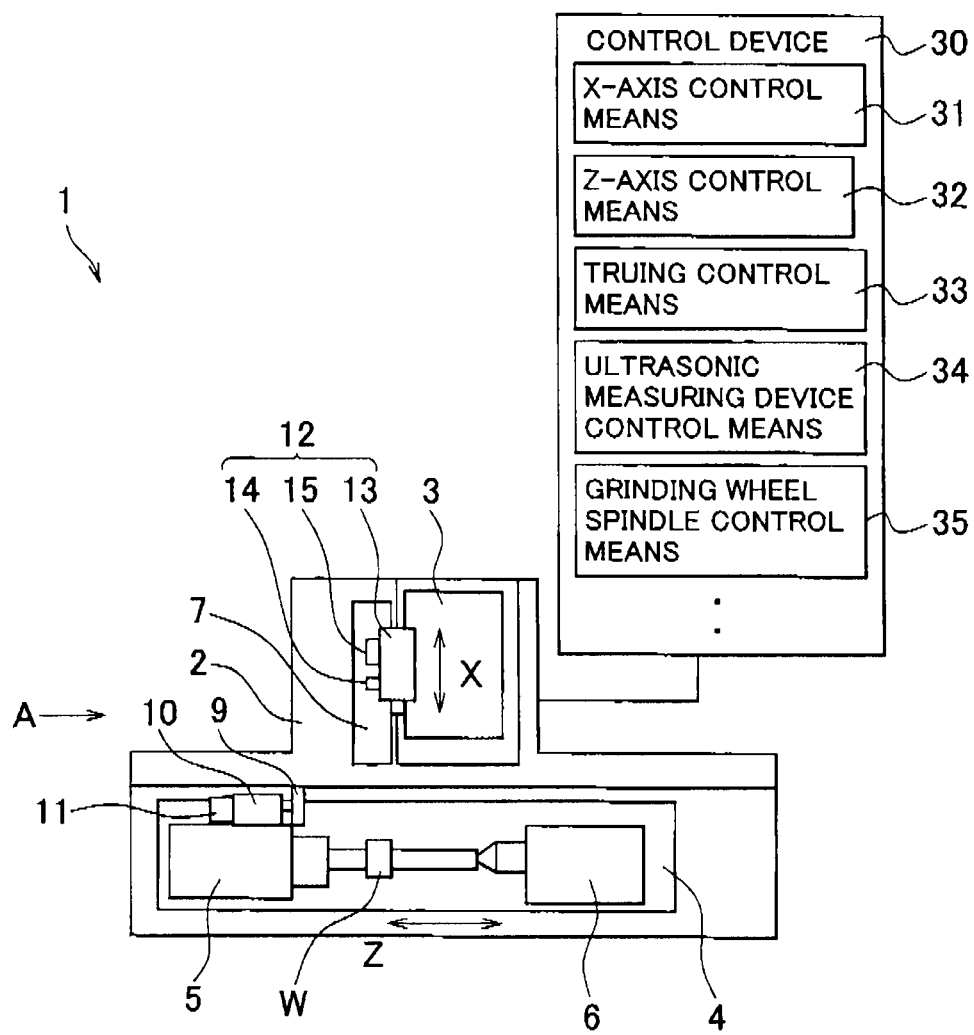
FIG. 1 is a schematic view that shows the overall configuration of a grinding machine according to an embodiment.
Figure 2:
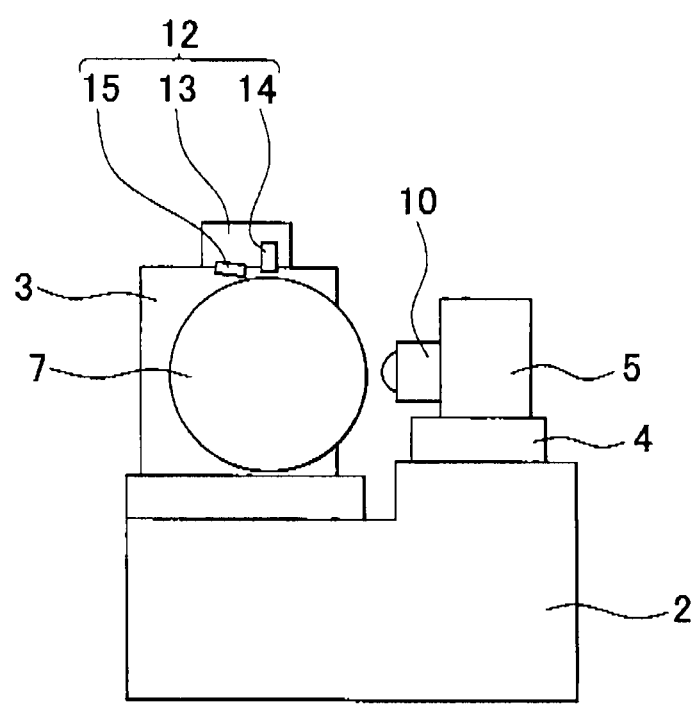
FIG. 2 is a side view of the grinding machine in FIG. 1.
Figure 3:
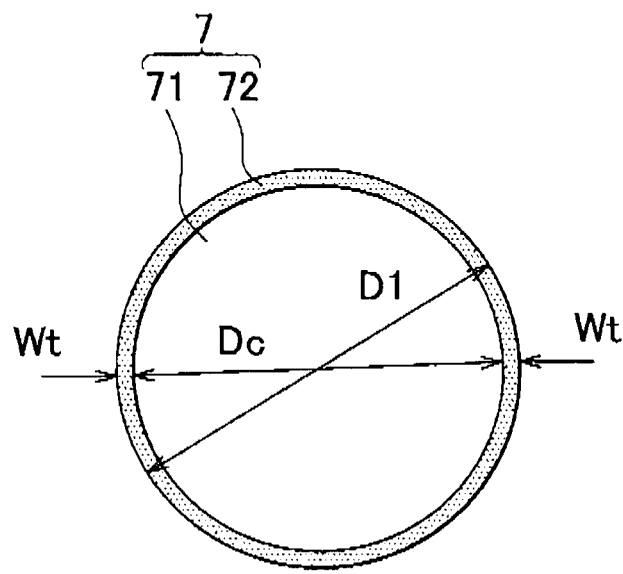
FIG. 3 is a schematic view that shows the configuration of a grinding wheel according to the embodiment.

As shown in FIG. 1 and FIG. 2, a grinding machine 1 includes a bed 2, and includes a grinding wheel head 3 and a table 4 placed on the bed 2. The grinding wheel head 3 is able to reciprocate in the X-axis direction. The table 4 is able to reciprocate in the Z-axis direction that is perpendicular to the X-axis direction. The grinding wheel head 3 rotatably supports a grinding wheel 7, and includes a grinding wheel spindle motor (not shown) that rotates the grinding wheel 7. The grinding wheel spindle motor is provided with a phase detector (not shown). The phase detector measures the rotational phase of the grinding wheel 7. As shown in FIG. 3, the grinding wheel 7 is a core grinding wheel that is configured by forming a grinding layer 72 on the outer periphery of a metal core 71. An ultrasonic measuring device 12 is installed on the upper surface of the grinding wheel head 3. The ultrasonic measuring device 12 is formed of a holding portion 13, an ultrasonic sensor 14 and a grinding fluid supply nozzle 15. A spindle 5 and a tailstock 6 are provided on the table 4. The spindle 5 rotatably supports one end of a workpiece W and is rotationally driven by a spindle motor (not shown). The tailstock 6 rotatably supports the other end of the workpiece W. The workpiece W is supported by the spindle 5 and the tailstock 6, and is rotationally driven during a grinding process. The spindle 5 is provided with a truing device 10. The truing device 10 rotatably supports a truing roll 9 that is rotationally driven by a truing motor 11.

The grinding machine 1 includes a controller 30. The controller 30 executes predetermined programs to carry out an automated grinding process, a truing process and a grinding wheel diameter measuring process. The functional configuration of the controller 30 includes X-axis control means 31, Z-axis control means 32, truing control means 33, ultrasonic measuring device control means 34, grinding wheel spindle control means 35, etc. The X-axis control means 31 controls the feed motion of the grinding wheel head 3. The Z-axis control means 32 controls the feed motion of the table 4. The truing control means 33 controls the truing device 10. The ultrasonic measuring device control means 34 controls the ultrasonic measuring device 12. The grinding wheel spindle control means 35 controls the rotation of the grinding wheel 7.

A method of measuring the outside diameter of the grinding wheel 7 in the grinding machine 1 will be described below with reference to FIG. 3 to FIG. 8.

The principle of measuring the outside diameter of the grinding wheel 7 will be described below. As shown in FIG. 3, when the outside diameter of the core 71 is Dc and the thickness of the grinding layer 72 is Wt, the outside diameter D1 of the grinding wheel 7 is expressed by $D1=Dc+2 \times Wt$. If the outside diameter Dc of the core 71 is obtained in advance, it is possible to calculate the outside diameter D1 of the grinding wheel 7 by measuring the thickness Wt of the grinding layer 72 that is worn during grinding. The outside diameter Dc of the core 71 is obtained by measuring it in advance, for example, when the grinding wheel 7 is manufactured.

Figure 4:
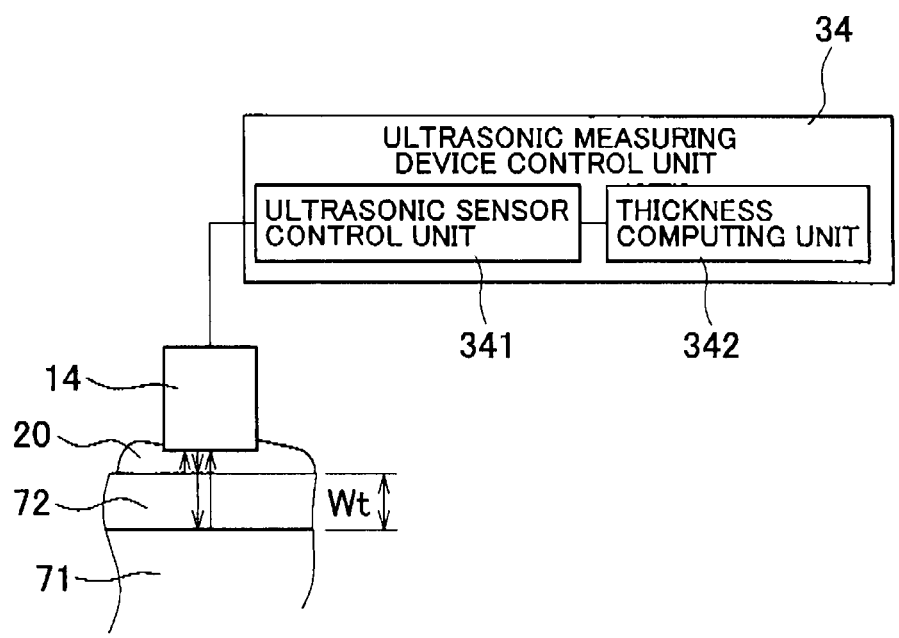
FIG. 4 is a view that shows the principle of ultrasonic measurement according to the embodiment.
Figure 5:
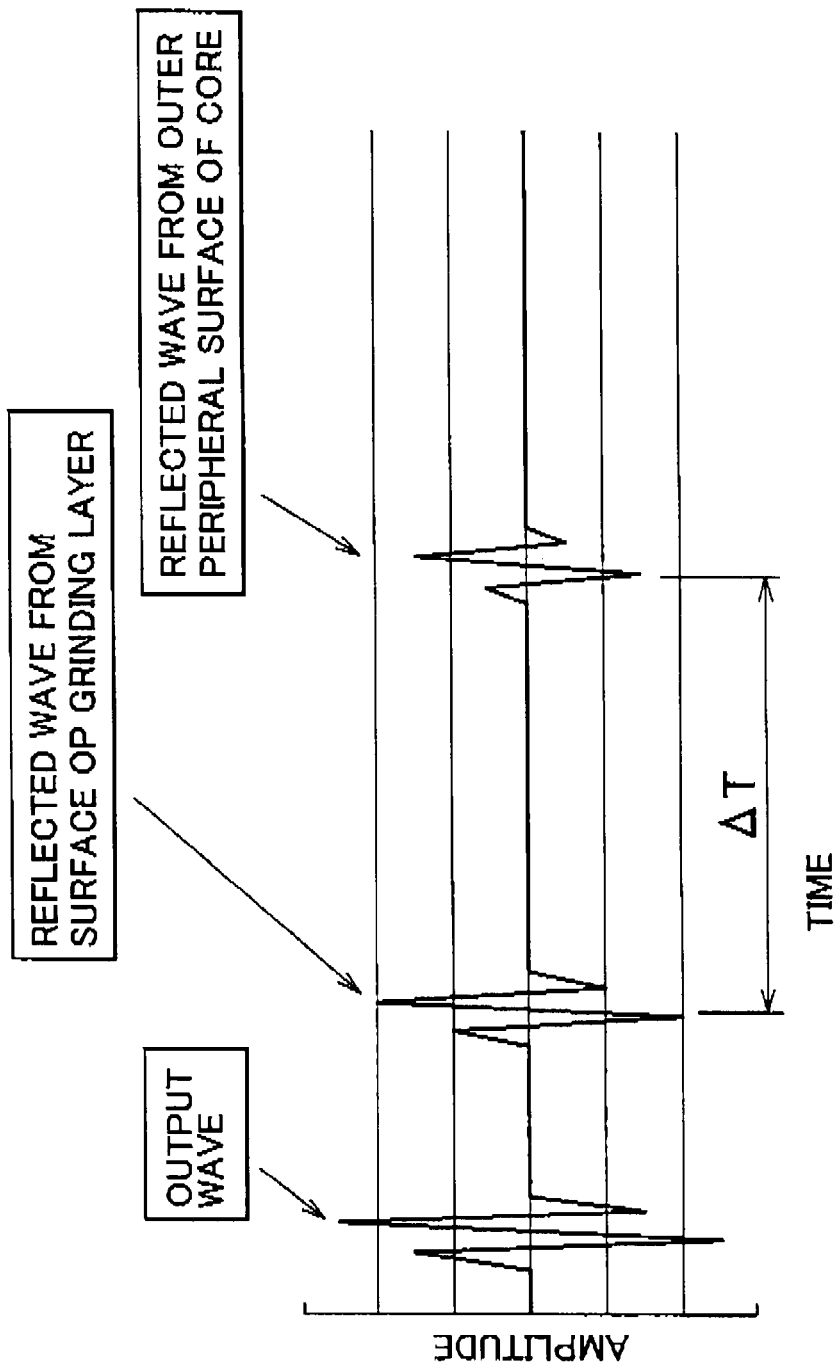
FIG. 5 is a graph that shows measurement of a reflected ultrasonic wave according to the embodiment.

The thickness Wt of the grinding layer 72 is measured as follows. As shown in FIG. 4, the direction in which the ultrasonic sensor 14 outputs an ultrasonic wave is perpendicular to the outer peripheral surface of the grinding layer 72, the space between the ultrasonic sensor 14 and the outer peripheral surface of the grinding layer 72 is filled with grinding fluid 20 supplied from the grinding fluid supply nozzle 15, and the ultrasonic sensor 14 is arranged at a predetermined distance from the outer peripheral surface of the grinding layer 72. An ultrasonic wave output from the ultrasonic sensor 14 propagates through the grinding fluid 20 and then reaches the surface of the grinding layer 72. At this time, part of the ultrasonic wave is reflected and the remaining part of the ultrasonic wave propagates through the inside of the grinding layer 72 and then reaches the outer peripheral surface of the core 71. At the outer peripheral surface of the core 71 as well, part of the ultrasonic wave is reflected and the remaining part of the ultrasonic wave propagates through the inside of the core 71. Here, the ultrasonic wave reflected from the surface of the grinding layer 72 and the ultrasonic wave reflected from the outer peripheral surface of the core 71 are received by the ultrasonic sensor 14. As shown in FIG. 5, when the arrival time difference between the two reflected waves is $\Delta T$ and the sonic velocity of the ultrasonic wave in the grinding layer 72 is V, the thickness Wt of the grinding layer 72 may be expressed by $Wt=\Delta T \times V/2$.

Figure 6:
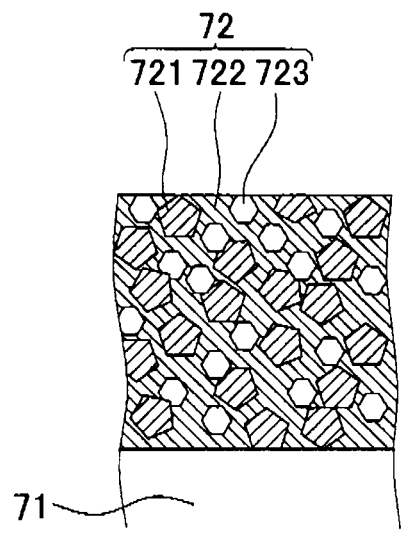
FIG. 6 is a detailed view that shows the structure of a grinding layer of the grinding wheel according to the embodiment.

As shown in FIG. 6, the grinding layer 72 is a composite material made of a plurality of materials, that is, abrasive grains 721, a binder 722 and aggregate grains 723 with different sonic velocities. Therefore, the sonic velocity V in the grinding layer 72 is a mean sonic velocity determined from the sonic velocities peculiar to the respective materials and the content of each material in the grinding layer 72. Therefore, even when the removal amount of the grinding layer 7 is constant at any point, the arrival time difference between two reflected waves may vary among the points due to variations in the content of each material among the points and the type of the material removed from the surface layer. As a result, there is a possibility that an error is caused in measurement of the thickness of the grinding layer 72.

In order to solve the above problem, ultrasonic measurement is conducted as follows. Multiple ultrasonic measurement points at a grinding layer are set to predetermined positions, the initial grinding layer thickness Wt0 is measured at each point and the time difference $\Delta$T0 in arrival at the ultrasonic sensor 14 between an ultrasonic wave reflected from the surface of the grinding layer 72 and an ultrasonic wave reflected from the outer peripheral surface of the core 71 is measured at each point, and then each initial grinding layer thickness Wt0 and each arrival time difference $\Delta$T0 are stored in the controller. Specifically, the initial grinding layer thickness at the point 1 is Wt10, the arrival time difference at the point 1 is $\Delta$T10, the initial grinding layer thickness at the point n is Wtn0 and the arrival time difference at the point n is $\Delta$Tn0.

As an example, a method of measuring a change in the thickness of the grinding layer at the predetermined point 1 will be described. A first change $\Delta$Wt11 in the thickness of the grinding layer 7 at the predetermined point 1 after the grinding layer is reduced is a half of the product of the difference $\Delta$T10-$\Delta$T11 between the initial value $\Delta$T10 of the arrival time difference between two reflected waves at the predetermined point 1 and the arrival time difference $\Delta$T11 at the time of measurement, and the sonic velocity V in the material removed from the surface layer at the predetermined point 1 at which actual measurement is performed. That is, $\Delta$Wt11=($\Delta$T10-$\Delta$T11)×V/2, so the thickness Wt11 of the grinding layer 72 at the time of the first measurement at the predetermined point 1 may be expressed by Wt11=Wt10-$\Delta$Wt11=Wt10-($\Delta$T10-$\Delta$T11)×V/2. Similarly, the thickness Wt12 of the grinding layer 72 at the time of the second measurement at the predetermined point 1 may be expressed by Wt12=Wt11-($\Delta$T11-$\Delta$T12)×V/2. Hereinafter, it is possible to measure the current grinding layer thickness by sequentially subtracting the amount of change in the thickness from the immediately preceding grinding layer thickness.

The above description is tenable if the sonic velocity in a removed portion of the grinding layer 72 is constant; however, as is already described above, the grinding layer 72 is a composite material made of a plurality of materials with different sonic velocities. Therefore, as removal of the grinding layer 72 progresses, different materials are removed, so the sonic velocity at that point changes. For this reason, the above described continuity is interrupted, and the calculation in which the amount of change in the thickness is subtracted from the immediately preceding grinding layer thickness is untenable. Then, the amount of change in the thickness is subtracted from the above described grinding layer thickness at a plurality of points, and only the data at a point, at which only one type of material is removed and the sonic velocity in the removed material is identified, is used for subtraction to thereby ensure the continuity.

Figures 7A, 7B:
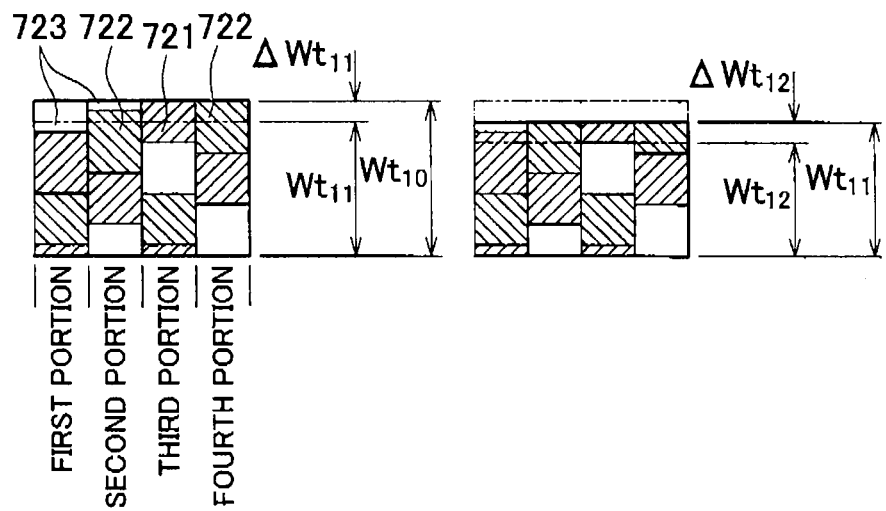
FIG. 7A and FIG. 7B are schematic views of the grinding layer according to the embodiment.

Specifically, description will be provided with reference to FIG. 7A and FIG. 7B that show a model of the grinding layer 72 formed of randomly mixed three types of materials as shown in FIG. 6. FIG. 7A is a view that shows a model formed such that the thickness of a grinding layer is Wt10 and the amount of change in the thickness is $\Delta$Wt11. The model is formed of a first portion in which the aggregate grain 723 having a thickness larger than $\Delta$Wt11 is arranged at the surface layer, a second portion in which the aggregate grain 723 having a thickness smaller than $\Delta$Wt11 is arranged at the surface layer, a third portion in which the abrasive grain 721 having a thickness larger than $\Delta$Wt11 is arranged at the surface layer, and a fourth portion in which a binder 722 having a thickness larger than $\Delta$Wt11 is arranged at the surface layer. FIG. 7B shows a state where the surface layer is removed by the thickness $\Delta$Wt11 from an initial state and then further removed by $\Delta$Wt12.

When the sonic velocity in the abrasive grains 721 is V1, the sonic velocity in the binder 722 is V2 and the sonic velocity in the aggregate grains 723 is V3, V1>V2>V3. The surface layer is removed by $\Delta$Wt11 and the thickness of the grinding layer is reduced from Wt10 to Wt11, so the time difference in arrival at the ultrasonic sensor 14 between an ultrasonic wave reflected from the surface of the grinding layer 72 and an ultrasonic wave reflected from the outer peripheral surface of the core 71 reduces from $\Delta$T10 to $\Delta$T11 at each portion. A decrease in the time difference ($\Delta$T10-$\Delta$T11) is denoted by $\Delta$t, and the decreases in the time differences $\Delta$t corresponding to the first portion to the fourth portion are respectively denoted by $\Delta$t1 to $\Delta$t4. $\Delta$t is determined on the basis of the sonic velocity in the removed material and the removal amount $\Delta$Wt11. At the first portion, the aggregate grain 723 is removed, so $\Delta$t1=$\Delta$Wt11/V3. Similarly, at the third portion, the abrasive grain 721 is removed, so $\Delta$t3=$\Delta$Wt11/N1, and, at the fourth portion, the binder 722 is removed, so $\Delta$t4=$\Delta$Wt11/V2. At the second portion, both the aggregate grain 723 and the binder 722 are removed, so $\Delta$t2 is equal to the sum of decreases in time differences in correspondence with the amounts of removal of the respective materials.

Here, when the decreases in the time differences $\Delta$t are compared with one another, because the removal amount is the same among the portions, $\Delta$t is inversely proportional to the sonic velocity in the removed material, that is, $\Delta$t1=$\Delta$Wt11/V3>$\Delta$t4=$\Delta$Wt11/V2>$\Delta$t3=$\Delta$Wt11/V1, and the mean sonic velocity Va in the second portion is V2>Va>V3, so $\Delta$t1>$\Delta$t4>$\Delta$t2>$\Delta$t3. The portion at which $\Delta$t is minimum among the plurality of measured portions is the portion at which only the abrasive grain 721 is removed, and the portion at which $\Delta$t is maximum is the portion at which only the aggregate grain 723 is removed. $\Delta$t at the portion at which the plurality of materials is removed falls within a range between the maximum value and the minimum value. Therefore, the product of $\Delta$tmin that is the minimum value of $\Delta$t and V1 that is the maximum value among the sonic velocities in the materials or the product of $\Delta$tmax that is the maximum value of $\Delta$t and V3 that is the minimum value among the sonic velocities in the materials is the removal amount of the grinding layer. That is, decreases in time differences $\Delta$t at multiple portions are measured at the same point at which the amount of removal of the grinding layer is substantially constant, and the product of $\Delta$tmin and V1 that is the maximum value among the sonic velocities in the materials or the product of $\Delta$tmax and V3 that is the minimum value among the sonic velocities in the materials is obtained to thereby make it possible to calculate the accurate removal amount of the grinding layer.

Measurement at the same point may be performed by arranging the ultrasonic measuring head 14 at a position facing the grinding working surface of the grinding wheel 7, measuring the rotational phase of the grinding wheel 7 using the phase detector provided at the grinding wheel drive motor and then performing measurement at the same rotational phase. The size of the component of a general grinding layer is larger than or equal to 50 μm, and the removal amount of the grinding layer to be measured is smaller than or equal to 10 μm, so the same material is removed at quite a few points among a plurality of measurement points.

A concrete ultrasonic measuring method will be described with reference to the flowchart of FIG. 8. When the grinding wheel 7 is replaced, a core diameter Dc, an initial grinding layer thickness Wt0, and time differences $\Delta T10$ to $\Delta Tn0$, at n predetermined points, in arrival at the ultrasonic sensor 14 between an ultrasonic wave reflected from the surface of the grinding layer 72 and an ultrasonic wave reflected from the outer peripheral surface of the core 71 are recorded (STP1). According to a grinding wheel diameter measuring command, the grinding fluid 20 is supplied to the gap between the ultrasonic sensor 14 and the grinding wheel 7 via the grinding fluid supply nozzle 15 (STP2). The rotational phase of the grinding wheel 7 is determined as a predetermined phase (STP3). An ultrasonic wave is output from the ultrasonic sensor 14 to the grinding layer 72 (STP4). Time differences $\Delta T11$ to $\Delta Tn1$, at n predetermined points, in arrival at the ultrasonic sensor 14 between an ultrasonic wave reflected from the surface of the grinding layer 72 and an ultrasonic wave reflected from the outer peripheral surface of the core 71 are recorded (STP5). Decreases $\Delta t$ in the arrival time differences $\Delta T$ at the n predetermined points are calculated using the respective mathematical expressions $\Delta t1=\Delta T10-\Delta T11$ to $\Delta tn=\Delta Tn0-\Delta Tn1$ (STP6). The maximum value $\Delta tmax$ and the minimum value $\Delta tmin$ are selected from among the decreases $\Delta t1$ to $\Delta tn$ (STP7). The removal amount $\Delta Wt1$ of the grinding layer is calculated using the mathematical expression $\Delta Wt1=\Delta tmax \times V3$ or $\Delta Wt1=\Delta tmin \times V1$ (STP8). The thickness Wt of the grinding layer is calculated using the mathematical expression $Wt1=Wt0-\Delta Wt1$ (STP9). The diameter D of the grinding wheel 7 is calculated by $D=Dc+2 \times Wt1$ (STP10). The initial values are updated as $Wt=Wt1$, $\Delta T1=\Delta T11$ to $\Delta Tn=\Delta Tn1$ (STP 11). Supply of the grinding fluid is stopped (STP12).

As described above, the removal amount of the grinding layer is calculated by selecting data at the point at which only a single material is removed and using a decrease in the difference in reflection time between ultrasonic waves due to removal and the sonic velocity in that material, so it is possible to accurately measure the thickness of the grinding layer and, as a result, it is possible to accurately measure the outside diameter of the grinding wheel 7. In addition, measurement may be performed in a short period of time, that is, a time period shorter than or equal to several milliseconds, and measurement may be performed irrespective of whether there is grinding fluid, so it is possible to perform measurement during a grinding process or a truing process.

Figure 9:
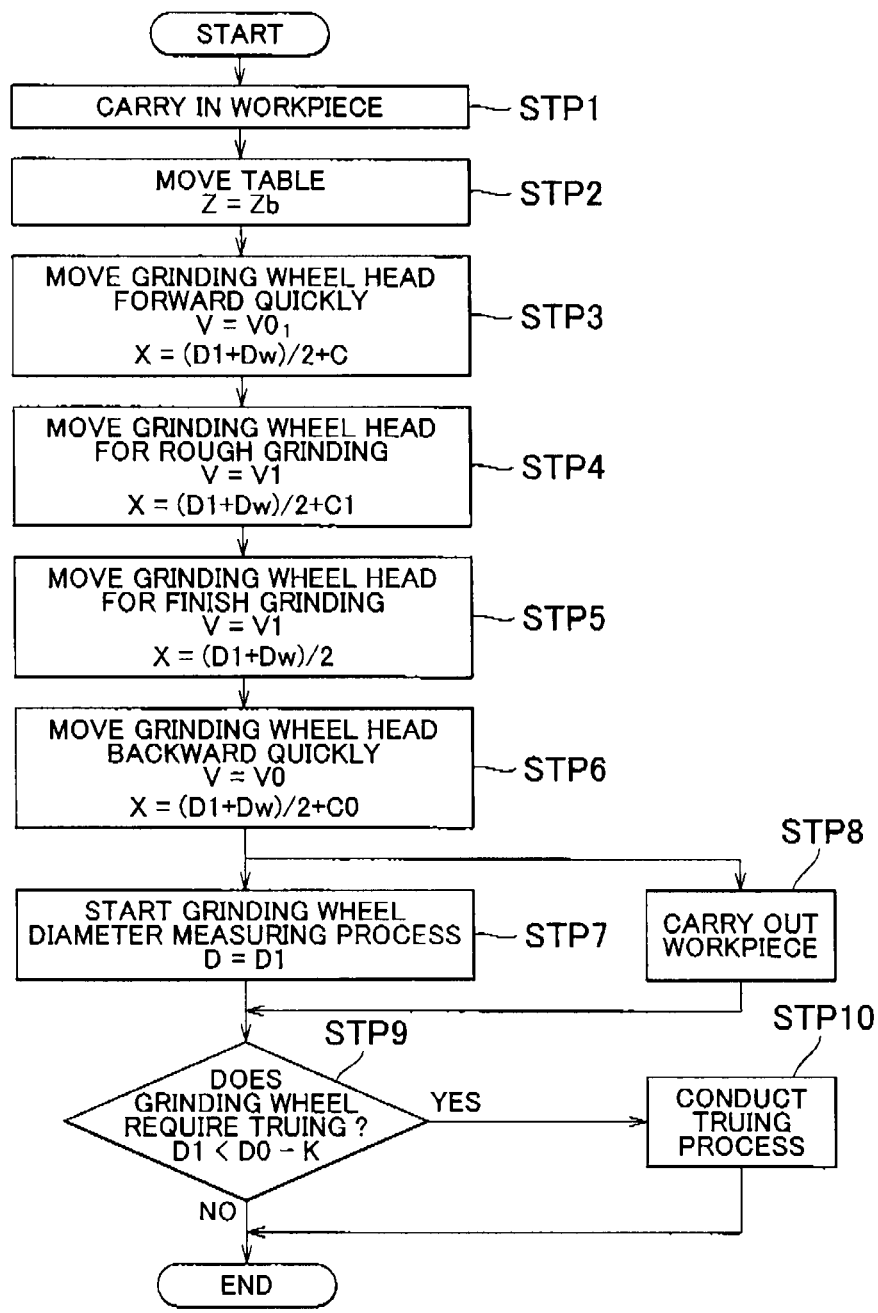
FIG. 9 is a flowchart that shows a grinding wheel outside diameter measuring process according to the embodiment.

The grinding process in which a workpiece W is subjected to plunge grinding using the grinding wheel 7 in the grinding machine 1 will be described with reference to the flowchart shown in FIG. 9. In a state where the grinding wheel 7 is being rotationally driven, the workpiece W is carried in such that the workpiece W may be held by the spindle 5 and the tailstock 6 (STP1). The table 4 is moved such that the machined portion of the workpiece W faces the grinding working surface of the grinding wheel 7 (STP2). The workpiece W is rotated, and the grinding wheel head 3 is moved forward quickly to a position at which the surface of the grinding wheel 7 is spaced by a predetermined distance from the surface of the workpiece W (STP3). The grinding wheel head 3 is moved forward for rough grinding to a position at which the surface of the grinding wheel 7 is spaced by C1 from the finished diameter surface of the workpiece W (STP4). The grinding wheel head 3 is moved forward for finish grinding to a position at which the surface of the grinding wheel 7 is in contact with the finished diameter surface of the workpiece W and then the grinding is ended (STP5). The grinding wheel head 3 is moved backward quickly to a position at which the surface of the grinding wheel 7 is spaced by C0 from the finished diameter surface of the workpiece W (STP6). The grinding wheel diameter measuring process in which the outside diameter of the grinding working surface of the grinding wheel 7 is measured by the ultrasonic measuring device is started (STP7). The workpiece W is carried out of the grinding machine at the same time that STP7 is performed (STP8). It is determined whether the grinding wheel diameter measured in STP7 is smaller than or equal to a predetermined value due to wear caused by grinding (STP9). When the grinding wheel diameter is smaller than or equal to the predetermined value, a predetermined truing process is conducted (STP10), after which the grinding process is ended. When the grinding wheel diameter is larger than the predetermined value, the grinding process is ended directly.

As described above, by measuring the outside diameter of the grinding wheel, the amount of wear of the grinding working surface of the grinding wheel due to grinding is measured in each grinding process to determine whether to use the grinding wheel. Therefore, in comparison with an existing grinding method in which a predetermined number of workpieces are ground and then truing is conducted, the grinding wheel may be effectively used and, in addition, a defective workpiece due to abnormal wear may be prevented.

Figure 10:
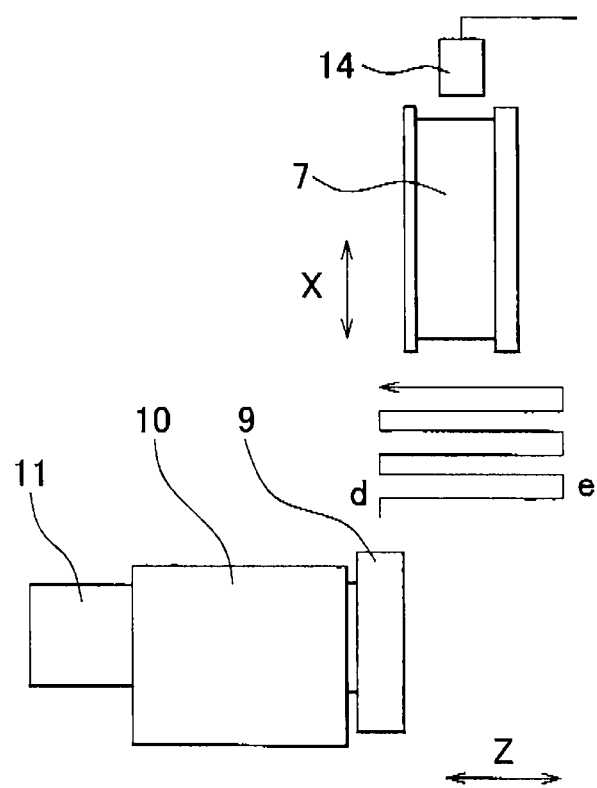
FIG. 10 is a schematic view that shows a truing operation according to the embodiment.
Figure 11:
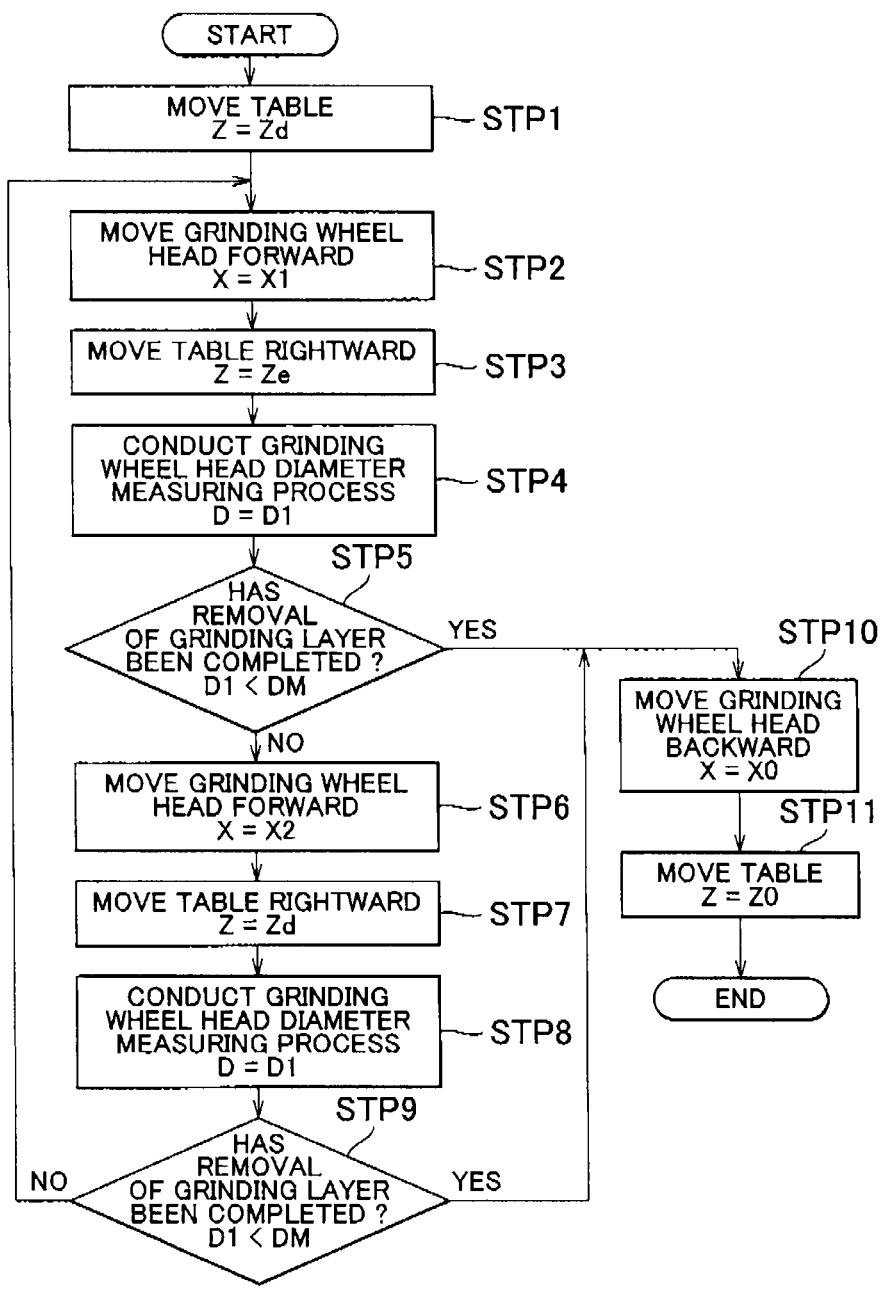
FIG. 11 is a flowchart that shows a truing process according to the embodiment.

Next, a truing process for the grinding wheel 7 using the above described grinding wheel diameter measurement with an ultrasonic wave will be described with reference to FIG. 10 and FIG. 11. The grinding wheel diameter reduces due to wear of the grinding working surface of the grinding wheel 7 caused by grinding, and a step is formed with respect to a portion that is not used for grinding as shown in FIG. 10. It is an object of truing to maintain the shape accuracy and grinding performance of the grinding wheel 7 by removing the step and further removing the grinding working surface by a predetermined amount. It is important to avoid unnecessary wear of the grinding wheel by minimizing the removal amount of the grinding wheel. Therefore, it is necessary to measure the outside diameter of the worn grinding working surface and measure the removal amount during truing. The outside diameter of the grinding working surface is measured through the grinding wheel diameter measuring process in the grinding process described above, and it is determined whether to conduct truing on the basis of the reduction amount of the outside diameter.

A concrete truing method will be described with reference to the flowchart shown in FIG. 11. The truing roll 9 is moved by the table 4 in the Z-axis direction to be set at a start position d shown in FIG. 10 (STP1). The truing roll 9 and the grinding wheel 7 are rotated, and the grinding wheel 7 is moved forward so as to approach the truing roll 9 in the X-axis direction (STP2). Subsequently, the truing roll 9 is moved rightward by the table 4 in the Z-axis direction in a state where the truing roll 9 is in contact with the grinding wheel 7, and is stopped at a position e at which the contact of the grinding wheel 7 with the truing roll 9 ends (STP3). The grinding wheel diameter measuring process is conducted (STP4). It is determined whether removal has been completed. When the removal has been completed, the process proceeds to STP10; whereas, when the removal has not been completed, the process proceeds to STP6 (STP5). By moving the grinding wheel 7 forward in the X-axis direction by a predetermined amount, the truing roll 9 is caused to cut into the grinding wheel 7 (STP6). The truing roll 9 is moved leftward by the table 4 in a state where the truing roll 9 is in contact with the grinding wheel 7, and is stopped at the position d at which the contact of the grinding wheel 7 with the truing roll 9 ends (STP7). The grinding wheel diameter measuring process is conducted (STP8). It is determined whether removal has been completed. When the removal has been completed, the process proceeds to STP10; whereas, when the removal has not been completed, the process proceeds to STP2 (STP9). After the removal has been completed, the grinding wheel head is moved backward (STP10). The table is withdrawn to end the truing cycle (STP11).

As described above, the outside diameter of the grinding wheel may be measured in a short period of time for each grinding wheel removal process during a truing process, so truing for removing a necessary minimum amount of the grinding wheel is possible, and unnecessary wear of the grinding wheel may be prevented.

What is claimed is:

1. A grinding method for grinding a workpiece using a grinding wheel that has a grinding layer on an outer periphery of a core of the grinding wheel, comprising:
    recording an outside diameter of the core, a first thickness that is a thickness of the grinding layer and a first time difference that is a time difference in arrival at an ultrasonic sensor between a reflected wave from a surface of the grinding layer having the first thickness and a reflected wave from a surface of the outer periphery of the core;
    recording a second time difference that is a time difference in arrival at the ultrasonic sensor between a reflected wave from a surface of the grinding layer having a second thickness that is a thickness of the grinding layer and a reflected wave from the surface of the outer periphery of the core;
    calculating a decrease in time difference, which is a difference between the first time difference and the second time difference;
    calculating a predetermined reduction amount by a product of a component sonic velocity, which is a sonic velocity in a component that constitutes the grinding layer, and the decrease in time difference;
    calculating the second thickness by subtracting the predetermined reduction amount from the first thickness;
    calculating an outside diameter of the grinding wheel based on a sum of double the second thickness and the outside diameter of the core; and
    controlling a grinding operation of the workpiece and a truing operation of the grinding wheel on the basis of the calculated outside diameter of the grinding wheel.

2. The grinding method according to claim 1, further comprising measuring a decrease in time difference between the first time difference and the second time difference at a plurality of points, wherein the predetermined reduction amount is calculated on condition that the component sonic velocity is the fastest among sonic velocities in components that constitute the grinding layer and the decrease in time difference is the smallest among the decreases in time differences measured at the plurality of points.

3. The grinding method according to claim 1, further comprising measuring a decrease in time difference between the first time difference and the second time difference at a plurality of points, wherein the predetermined reduction amount is calculated on condition that the component sonic velocity is the slowest among sonic velocities in components that constitute the grinding layer and the decrease in time difference is the largest among the decreases in time differences measured at the plurality of points.

4. The grinding method according to claim 1, wherein the outside diameter of the grinding wheel is measured while the workpiece is being ground, and the grinding operation is controlled using an amount of change in the outside diameter of the grinding wheel as an amount of wear of the grinding wheel due to grinding.

5. The grinding method according to claim 1, wherein the outside diameter of the grinding wheel is measured while the grinding wheel is being trued, and the truing operation is controlled using an amount of change in the outside diameter of the grinding wheel as a removal amount of the grinding wheel due to truing.

* * * * *